(12) United States Patent
Nakabayashi et al.

(10) Patent No.: US 8,895,186 B2
(45) Date of Patent: *Nov. 25, 2014

(54) ANODE FOR LITHIUM-ION RECHARGEABLE BATTERY AND LITHIUM-ION RECHARGEABLE BATTERY INCLUDING SAME

(75) Inventors: Takashi Nakabayashi, Hitachi (JP); Shin Takahashi, Mito (JP); Motoki Ohta, Shimamoto (JP); Yoshihito Yoshizawa, Shimamoto (JP)

(73) Assignee: Hitachi, Ltd., Tokyo (JP)

( * ) Notice: Subject to any disclaimer, the term of this patent is extended or adjusted under 35 U.S.C. 154(b) by 431 days.

This patent is subject to a terminal disclaimer.

(21) Appl. No.: 13/117,406

(22) Filed: May 27, 2011

(65) Prior Publication Data
US 2011/0294012 A1    Dec. 1, 2011

(30) Foreign Application Priority Data
May 28, 2010    (JP) ................................. 2010-122203

(51) Int. Cl.
H01M 4/38         (2006.01)
H01M 4/134        (2010.01)
H01M 10/0525      (2010.01)
H01M 4/02         (2006.01)

(52) U.S. Cl.
CPC ............... *H01M 4/38* (2013.01); *H01M 4/134* (2013.01); *Y02E 60/122* (2013.01); *H01M 2004/021* (2013.01); *H01M 10/0525* (2013.01)
USPC ........ 429/218.1; 429/219; 429/221; 429/224; 429/231.8; 429/129

(58) Field of Classification Search
USPC ............ 429/231.8, 129, 219, 218.1, 221, 224
See application file for complete search history.

(56) References Cited

U.S. PATENT DOCUMENTS

2004/0058248 A1    3/2004  Inoue
2004/0214085 A1   10/2004  Sheem
(Continued)

FOREIGN PATENT DOCUMENTS

CN    101188281 A      5/2008
EP     1873846 A1 *    1/2008
(Continued)

OTHER PUBLICATIONS

Naoya Kobayashi, Development of Next Generation Electrode Materials for Lithium-Ion Rechargeable Battery, Samsung Yokohama Research Institute, Aug. 21, 2009 with English translation.
(Continued)

*Primary Examiner* — Mark F Huff
*Assistant Examiner* — Olatunji Godo
(74) *Attorney, Agent, or Firm* — Antonelli, Terry, Stout & Krauss, LLP.

(57) ABSTRACT

It is an objective of the present invention to provide a lithium-ion rechargeable battery anode which can control the volume change of a primary particle of a negative-electrode active material other than a carbon-based material and that can prevent cracks due to stress caused by the volume change from occurring and extending. There is provided an anode for a lithium-ion rechargeable battery including a primary particle of a negative-electrode active material, a conductive material, and a binder, the negative-electrode active material including at least one of silicon and tin, and at least one element selected from elements that do not chemically react with lithium, in which holes are present both in an inner core region in the central region of the primary particle of the negative-electrode active material and in a periphery region that covers the inner core region.

19 Claims, 3 Drawing Sheets

(56) References Cited

U.S. PATENT DOCUMENTS

| | | |
|---|---|---|
| 2006/0040182 A1 | 2/2006 | Kawakami et al. |
| 2007/0009801 A1 | 1/2007 | Inagaki et al. |
| 2009/0061322 A1 | 3/2009 | Kawakami et al. |
| 2009/0269669 A1* | 10/2009 | Kim et al. ............... 429/231.8 |
| 2012/0219858 A1* | 8/2012 | Nakabayashi et al. ........ 429/219 |

FOREIGN PATENT DOCUMENTS

| | | | |
|---|---|---|---|
| JP | 10-294112 A | | 11/1998 |
| JP | 2001-138013 | | 5/2001 |
| JP | 2002-170560 A | | 6/2002 |
| JP | 2004-022512 | | 1/2004 |
| JP | 2004-047182 | | 2/2004 |
| JP | 2004-087264 A | | 3/2004 |
| JP | 2004-214054 | * | 7/2004 |
| JP | 2004-311429 A | | 11/2004 |
| JP | 2004-356054 A | | 12/2004 |
| JP | 2005-071771 A | | 3/2005 |
| JP | 2006-216374 | | 8/2006 |
| JP | 2007-123100 | | 5/2007 |
| JP | 2009-032644 | | 2/2009 |
| WO | WO 2010035919 | * | 4/2010 |

OTHER PUBLICATIONS

JP Office Action of Appln. No. 2010-122203 dated Oct. 23, 2012 with partial English translation.

Communication mailed Jan. 22, 2013, in connection with Japanese Patent Application No. JP 2010-122203, 2 pages; Japanese Patent Office, Japan.

Communication mailed Jul. 1, 2013, in connection with Chinese Patent Application No. 201110139344.7, 7 pages; State Intellectual Property Office of the People's Republic of China, Republic of China.

* cited by examiner

1 PRIMARY PARTICLE OF NEGATIVE-ELECTRODE ACTIVE MATERIAL

FIG. 6

ANODE FOR LITHIUM-ION RECHARGEABLE BATTERY AND LITHIUM-ION RECHARGEABLE BATTERY INCLUDING SAME

CLAIM OF PRIORITY

The present application claims priority from Japanese patent application serial no. 2010-122203 filed on May 28, 2010, the content of which is hereby incorporated by reference into this application.

BACKGROUND OF THE INVENTION

1. Field of the Invention

The present invention relates to anodes for lithium-ion ($Li^+$) rechargeable batteries and lithium-ion rechargeable batteries including the anodes.

2. Description of the Related Art

A lithium-ion rechargeable battery is a kind of non-aqueous electrolyte secondary cells in which lithium ions move between an anode (negative electrode) and a cathode (positive electrode) during charging and discharging processes. Lithium-ion rechargeable batteries have higher energy density than other secondary cells such as nickel hydride rechargeable batteries and are widely used as secondary cells for supplying power to mobile electronic devices.

Meanwhile, as mobile electronic devices have become more advanced and more compact in recent years, there has been growing demand for smaller and higher-capacity lithium-ion rechargeable batteries to be used as power supplies for such devices. In order to meet this demand, it is indispensable to achieve higher capacity of negative-electrode active materials.

Carbon-based materials have conventionally been used for negative-electrode active materials. They absorb/desorb lithium ions by intercalating/deintercalating lithium-ions between graphene layers. The theoretical specific capacity of carbon-based materials is 372 Ah/kg. Negative-electrode active materials composed of carbon-based materials already have actual capacities close to the theoretical specific capacity, and there is little room to dramatically improve their capacities.

Currently, therefore, a quest for alternative materials to carbon-based materials is being pursued vigorously, and there is a growing interest in alloy negative electrodes (or metal negative electrodes) that promise to have high capacities. Alloy negative electrodes (or metal negative electrodes) perform charge/discharge reactions through alloying/dealloying reactions, which are indicated in the formula: $xLi^+ + M + xe^- \Leftrightarrow Li_xM$, wherein M is a metal element. For example, the theoretical specific capacity of tin (Sn) and that of silicon (Si) are 990 Ah/kg and 4200 Ah/kg, respectively, which are several to 10 or more times higher than the theoretical specific capacity of carbon-based materials.

On the other hand, the volumes of these materials change largely upon charging and discharging the battery. It is known that tin expands/contracts by 360% and silicon expands/contracts by as much as 420% during the intercalation and deintercalation of lithium ions. The structure of an electrode cannot be maintained due to stress caused by this large volume change accompanied by charging and discharging the battery. Thereby, the cycle characteristics of these materials are unfortunately inferior compared to those of carbon-based materials to a remarkable extent. In other words, alternative materials must be considered in terms of improving cycle characteristics.

For example, a negative-electrode active material for lithium secondary cells has been suggested in JP-A 2009-32644, the negative-electrode active material having a number of Si cores and an alloy matrix surrounding the Si cores. The alloy that composes the alloy matrix contains at least one element x selected from Al (aluminum), Sn, Ag (silver), Bi (bismuth), and Zn (zinc) and at least one element y that is different from the element x and selected from Co (cobalt), Ni (nickel), Ag, Al, Fe (iron), Zr (zirconium), Cr (chromium), Cu (copper), P (phosphorus), V (vanadium), Mn (manganese), Nb (niobium), Mo (molybdenum), In (indium), and rare earth elements. The alloy that composes the alloy matrix preferably contains at least one element z that is different from the element x and the element y and selected from Ag, Al, Bi, P, Sn, Ti, and Zn. According to JP-A 2009-32644, there can be provided a negative-electrode active material for lithium secondary cells, the negative-electrode active material being capable of improving cycle characteristics of lithium secondary cells and having excellent productivity.

Also, a battery provided with a positive electrode, a negative electrode, and an electrolyte has been suggested in JP-A 2004-22512, the negative electrode including a porous body composed of an elemental, alloy, or compound metal or metalloid element capable of alloying with lithium. The porous body is a continuous solid substance containing holes. According to JP-A 2004-22512, the negative-electrode material of JP-A 2004-22512 has not only a high capacity but also excellent charge-discharge characteristics, since its porous body makes it less likely for the structure to collapse by absorbing the volume change upon absorbing and desorbing lithium.

In addition, a negative electrode active material for lithium secondary cells has been suggested in JP-A 2004-214054, the negative electrode active material being composed of an aggregate of Si porous particles formed with a number of voids therein. The voids have an average hole diameter of between 10 nm and 10 µm, and the aggregate has an average particle diameter of between 1 µm and 100 µm. According to JP-A 2004-214054, there can be provided a negative-electrode active material that can prevent: pulverization due to expansion and contraction of the volume of the active material upon charging and discharging the battery; peeling of the active material from the current collector; and loss of contact of the active material with the conductive material.

However, with the negative-electrode active material for lithium secondary cells described in JP-A 2009-32644, cycle characteristics are not sufficiently improved. The negative-electrode material described in JP-A 2004-22512, which is a porous body, may pulverize due to lack of sufficient mechanical strength. Since the negative-electrode active material for lithium secondary cells described in JP-A 2004-214054 is composed of an aggregate of silicon porous particles and has no other matrix that contributes to stress relaxation, relaxation of stress caused by charging and discharging the battery is likely to be insufficient. Also, composed only of silicon, it unfortunately has poor electrical conductivity.

SUMMARY OF THE INVENTION

In view of the foregoing, it is an objective of the present invention to solve the above problems and provide a lithium-ion rechargeable battery anode which can control the volume change of a primary particle of a negative-electrode active material other than a carbon-based material and that can prevent cracks due to stress caused by the volume change from occurring and extending. Furthermore, it is another objective of the present invention to provide a lithium-ion rechargeable battery that has a high capacity and improved cycle life (cycle characteristics) by using such an anode.

(I) According to one aspect of the present invention, there is provided an anode for a lithium-ion rechargeable battery including a primary particle of a negative-electrode active material, a conductive material, and a binder, the negative-electrode active material including at least one of silicon and tin, and at least one element selected from elements that do not chemically react with lithium, in which holes are present both in an inner core region in the central region of the primary particle of the negative-electrode active material and in a periphery region that covers the inner core region.

In the present invention, a primary particle of a negative-electrode active material is defined as a continuous solid substance (e.g., a polycrystalline body bound by metallic bonding). Also, a spherical region that is centered around the gravity center of the primary particle of the negative-electrode active material and has a diameter equal to 50% of the diameter of the primary particle is defined as the inner core region, and a region that covers the inner core region is defined as the periphery region.

In the anode for lithium-ion rechargeable batteries in accordance with the above-described aspect (I), the following modifications and changes can be made:

(i) The dispersivity, which is a value obtained by dividing the standard deviation of a distance between adjacent centroids of the holes by an average distance between adjacent centroids of the holes, is 1 or less.

(ii) The primary particles of the negative-electrode active material have an average particle diameter of 50 μm or less.

(iii) The holes have an average hole diameter of 1 μm or less.

(iv) The primary particles of the negative-electrode active material have an average porosity of not less than 5 vol % but not more than 80 vol %.

(v) Silicon and/or tin contained in the primary particle of the negative-electrode active material has an average crystallite diameter of 1 μm or less.

(vi) An average distance between adjacent holes in the primary particle of the negative-electrode active material is 2 μm or less.

(vii) An average distance between adjacent holes in the primary particle of the negative-electrode active material is not more than 15 times an average crystallite diameter of silicon and/or tin contained in the primary particle of the negative-electrode active material.

(viii) The negative-electrode active material contains a total of 50 mass % or more of silicon and tin.

(ix) The at least one element that does not chemically react with lithium is selected from iron, nickel, copper, cobalt, manganese, silver, and gold.

(x) When the negative-electrode active material contains tin, the negative-electrode active material further contains at least one element selected from boron, phosphorus, carbon, and silicon, and the content of the at least one selected element is 0.01 mass % or more.

(xi) The negative-electrode active material is fabricated by a rapid quenching technique.

(xii) The negative-electrode active material is fabricated by a single roll method.

(II) According to another aspect of the present invention, there is provided a lithium-ion rechargeable battery including a cathode, an anode, a separator, and an electrolyte, in which the anode is the above-described anode for lithium-ion rechargeable batteries according to the invention.

Advantages of the Invention

According to the present invention, it is possible to provide a lithium-ion rechargeable battery anode which can control the volume change of a primary particle of a negative-electrode active material other than a carbon-based material and can prevent cracks due to stress caused by the volume change from occurring and extending. Moreover, there can be also provided a lithium-ion rechargeable battery that has a high capacity and improved cycle life (cycle characteristics) by using such an anode.

DETAILED DESCRIPTION OF THE PREFERRED EMBODIMENTS

Preferred embodiments of the present invention will be described hereinafter with reference to the accompanying drawings. It should be noted that the present invention is not limited to the embodiments described here, and appropriate combinations and modifications can be implemented without changing the gist of the invention.

(Anode)

Figure 1:
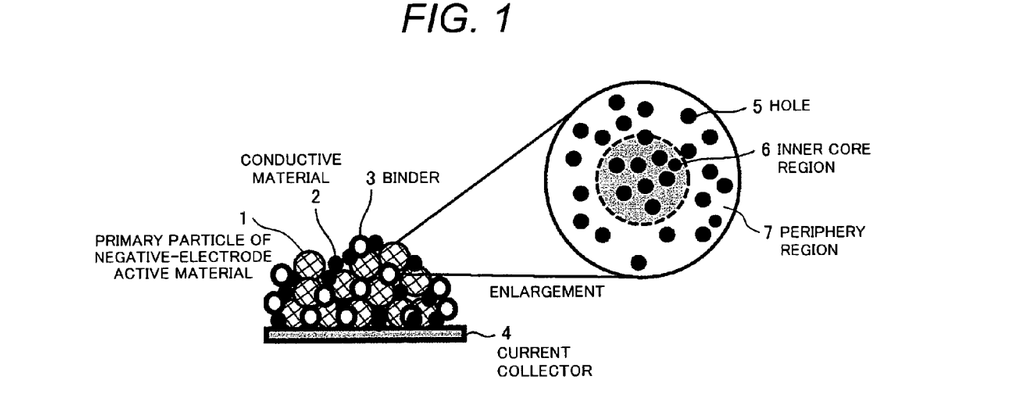
FIG. 1 is a schematic illustration showing an enlarged cross-sectional view of an example of an anode for lithium-ion rechargeable batteries in accordance with an embodiment of the present invention.

FIG. 1 is a schematic illustration showing a cross-sectional view of an example of an anode for lithium-ion rechargeable batteries in accordance with an embodiment of the present invention. FIG. 1 also shows an enlarged cross-sectional schematic view of a primary particle of a negative-electrode active material. As shown in FIG. 1, a mixture of a primary particle of a negative-electrode active material 1, a conductive material 2, and a binder 3 is formed on a current collector 4. An anode for lithium-ion rechargeable batteries in accordance with the present invention is characterized by the composition of the primary particle of the negative-electrode active material 1. Meanwhile, there is no particular limitation on the conductive material 2, the binder 3, and the current collector 4, and prior materials may be used for them.

(Negative-Electrode Active Material)

As described before, the negative-electrode active material in accordance with the present invention contains: at least one of silicon and tin; and at least one element selected from elements which do not chemically react with lithium. It may contain both silicon and tin. In order to achieve a high capacity, it preferably contains 50 mass % or more of silicon or tin. When it includes both silicon and tin, the total content of silicon and tin is preferably 50 mass % or more. When the total content of silicon and tin is less than 50 mass %, a high capacity is hardly achieved. Also, tin is preferably used in terms of lithium-ion diffusion rate (lithium-ion diffuses at a higher rate in tin) and electrical conductivity (tin has a higher electrical conductivity).

In the present invention, an element which does not chemically react with lithium may be any element that has a lower chemical reactivity than those of silicon and tin, as well as any element that does not chemically react with lithium at all. Such an element that does not chemically react with lithium preferably has good electrical conductivity, and more preferably is a transition element (transition metal), such as titanium, vanadium, chrome, manganese, iron, cobalt, nickel, copper, zinc, silver, gold, and indium. In particular, iron, nickel, copper, cobalt, manganese, silver, and gold are preferable, since they are high in electrical conductivity and therefore contribute to the improvement of electrical conductivity for the entire negative-electrode active material.

Each of the inner core region and the periphery region of a primary particle of the negative-electrode active material is composed of such elements as described above and has holes within. Because holes are present both in the core region and the periphery region of a primary particle, the volume change accompanied by a charge/discharge reaction can be compensated for by the particle as a whole. This is because the volume change of the primary particle of the negative-electrode active material can be evenly controlled (i.e., localization of the volume change can be prevented, and uneven distribution of stress can be avoided). Moreover, the holes prevent cracks from extending and the structure from collapsing. In addition, an element that does not chemically react with lithium serves as a component that maintains the structure, preventing the structure from collapsing. These produce a good effect for improving the cycle life of the negative-electrode active material.

There is no particular limitation on a shape of the holes, while the shape may be spherical, columnar, conical, cubic, rectangular parallelepipedic, and the like. Also, the dispersivity, which is a value obtained by dividing the standard deviation of a distance between adjacent centroids of the holes by the average distance between adjacent centroids of the holes, is preferably 1 or less. This means that the holes are evenly dispersed in the primary particle. Because the holes are evenly dispersed in the primary particle, cracks can be prevented from extending more effectively. The average distance between adjacent centroids of the holes and the standard deviation of the distance between adjacent centroids of the holes can be obtained by, e.g., taking a scanning electron micrograph of a cross section of the primary particle of the negative-electrode active material and analyzing the micrograph.

An average value of hole diameters (average hole diameter) is preferably 1 μm or less. This is because the number of holes increases, and as a result holes can exist evenly throughout a particle. This increase in the number of holes is also preferable because it means that there are more holes which prevent cracks from extending, making it possible to prevent the structure from collapsing. The average hole diameter is more preferably 0.4 μm or less, since this means even more holes are present, more evenly in a particle. In other words, there are even more holes to prevent cracks from extending, resulting in improved cycle life.

In the present invention, the average value of hole diameters is a median diameter (D50) on a volume basis of hole diameters measured by a mercury porosimeter, or the value of a mean circle equivalent diameter obtained by taking a scanning electron micrograph of a cross section of the primary particle of the negative-electrode active material and analyzing the micrograph. Alternatively, it may be a value determined by taking a scanning electron micrograph of the primary particle of the negative-electrode active material and measuring the diameters of the holes observed in any area of the micrograph. In the case of determining the average hole diameter based on a scanning electron micrograph, it is desirable that the number of holes to be measured be at least 20. Also, when a hole is not circular in cross section, the average value of the maximum length and the minimum length is deemed as the diameter of the hole.

An average particle diameter of primary particles of the negative-electrode active material is preferably 50 μm or less. This is because the absolute amount of volume change caused by a charge/discharge reaction can be controlled. On the other hand, an average particle diameter of more than 50 μm is not preferable because the absolute amount of volume change caused by a charge/discharge reaction becomes large. In the present invention, the average particle diameter is defined as a median diameter (D50) of particles measured by a laser diffraction particle diameter analyzer in the state of de-agglomerated particles by applying ultrasound or the like to them.

Each crystallite diameter of silicon and/or tin contained in a primary particle of the negative-electrode active material is preferably 1 μm or less. When a crystallite diameter of any element involved in a charge/discharge reaction is approximately equivalent to a hole diameter (1 μm or less), the expansion of the crystallite upon charging and discharging the battery can be absorbed by the hole, and therefore stress localization caused by volume change can be avoided. A crystallite diameter of 0.2 μm or less is preferable because stress can be further equalized and the maximum stress can be controlled.

In the present invention, the average crystallite diameter can be measured by observing crystallites with a scanning electron microscope, a transmission electron microscope, or the like. Also, it may be determined by taking an electron micrograph of a sample and measuring the sizes of the crystallites observed in any area of the micrograph. In either case, it is desirable that the number of crystallites to be measured be at least 20. Also, when a crystallite is not circular in cross section, the average value of the maximum length and the minimum length is deemed as the diameter of the crystallite.

When the negative-electrode active material contains tin, the negative-electrode active material preferably further contains 0.01 mass % or more of at least one element selected from boron, phosphorus, carbon, and silicon. Thereby, it is possible to reduce in size crystallites of elements involved in a charge/discharge reaction (i.e. tin and silicon) and holes contained in the primary particle of the negative-electrode active material.

An average distance between adjacent holes in a primary particle of the negative-electrode active material is preferably 2 μm or less. This is because cracks can be prevented from extending more effectively and the structure can be prevented from collapsing. Also, the average distance between adjacent holes is preferably not more than 15 times the above-described average crystallite diameter. This is because cracks can be prevented from extending more effectively and the structure can be prevented from collapsing. In the present invention, the average distance between adjacent holes is defined as a value obtained by subtracting the average hole diameter from the distance between adjacent centroids of the holes.

The primary particles of the negative-electrode active material preferably have an average porosity of not less than 5 vol % but not more than 80 vol %. When the average porosity is 5 vol % or more, volume change accompanied by a charge/discharge reaction can be alleviated. On the contrary, when the average porosity is less than 5 vol %, the volume change of crystallites cannot be absorbed sufficiently. Also, when the average porosity is more than 80 vol %, the volume of holes exceeds the volume increase of crystallites when the battery is fully charged. More specifically, the effect of controlling volume change reaches its limit, while the capacity per volume decreases. Therefore, a porosity of more than 80 vol % is not preferable.

In the present invention, the average porosity can be determined based on an areal proportion of the holes within a scanning electron micrograph of the primary particle of the negative-electrode active material. Alternatively, it can be measured by a mercury porosimeter. In the latter case, when holes are too small for mercury to intrude sufficiently, the average porosity may be found from the following equation: average porosity (%)=100×(d0−d1)/d0, wherein d1 is a bulk density of the primary particle of the negative-electrode active material and d0 is the true density of alloy particle that are identical to the negative-electrode active material in composition.

(Fabrication Method of Negative-electrode Active Material)

A rapid quenching technique can be preferably used to fabricate the negative-electrode active material. By using this technique, crystallite diameters can be reduced and holes can be formed in a primary particle. Rapid quenching techniques include the single roll method, the twin roll method, the centrifugation method (vertical), the centrifugation method (horizontal), the single roll method accompanying a planetary roll, the gun method, the piston-anvil method, the torsion-catapult method, the water flow spinning method, the rotating fluid spinning method, the glass coating spinning method, the gas atomizing method, and the water atomizing method. In particular, the single roll method is preferable because molten metal can be quenched very rapidly and crystallite diameters can be reduced. In addition, it is also preferable in that because a surface in contact with a chill roll and a surface not in contact with it are quenched at different quenching rates, a large temperature gradient occurs in the molten alloy, resulting in reduced hole sizes.

(Lithium-Ion Rechargeable Battery)

Figure 6:
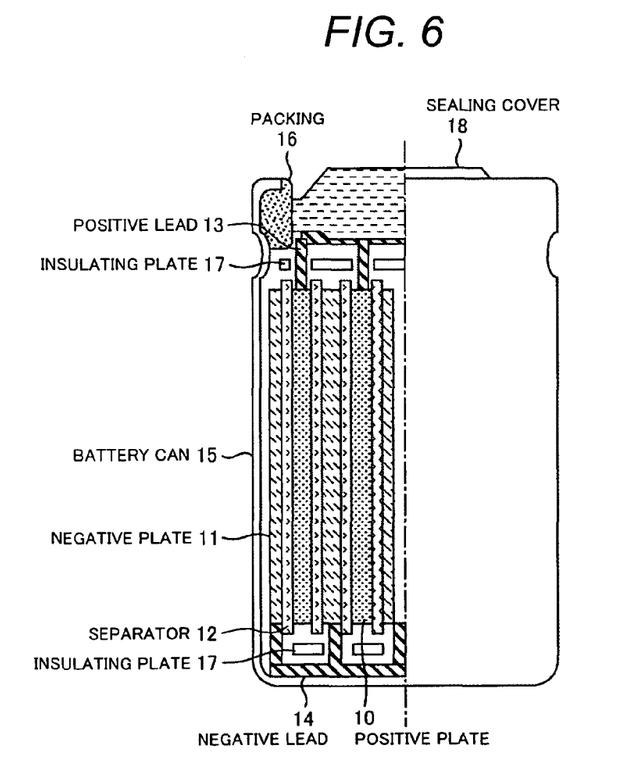
FIG. 6 is a schematic illustration showing a partial cross-sectional view of an example of a lithium-ion rechargeable battery in accordance with an embodiment of the present invention.

By using the above-described anode for lithium-ion rechargeable batteries according to the present invention, there can be provided a lithium-ion rechargeable battery which has a high capacity and improved cycle life (see, e.g., FIG. 6). FIG. 6 is a schematic illustration showing a partial cross-sectional view of an example of a lithium-ion rechargeable battery in accordance with an embodiment of the present invention.

EXAMPLES

The content of the present invention will be described in more detail hereinafter with reference to examples. However, the following examples are given merely as illustrative of the present invention and not to be construed as limiting thereof.

Preparation of Example 1

80 parts by mass of tin and 20 parts by mass of cobalt were mixed and melted by the arc melting method under an argon atmosphere and cooled to obtain an alloy. The alloy was pulverized into 5 to 10 mm pieces, melted by the high frequency heating method under an argon atmosphere, and quenched by the single roll method to obtain a ribbon-like rapidly quenched alloy. This ribbon-like rapidly quenched alloy was pulverized in a mortar and classified by sifting it through a sieve with a mesh of 45 μm to obtain primary particles of a negative-electrode active material in Example 1.

Preparation of Examples 2 to 4

Negative-electrode active materials of Examples 2 to 4 were fabricated in the same manner except that boron was added to them before they were melted by the high frequency heating method. The negative-electron active materials of Examples 2 to 4 thus obtained were subjected to quantitative analysis for boron by inductively coupled plasma atomic emission spectrometry (ICP-AES). The results are shown in Table 1.

TABLE 1

|  | Boron content |
| --- | --- |
| Example 2 | 0.02 mass % |
| Example 3 | 0.04 mass % |
| Example 4 | 1.96 mass % |

Preparation of Comparative Example 1

80 parts by mass of tin and 20 parts by mass of cobalt were mixed and melted by the arc melting method under an argon atmosphere and cooled to obtain an alloy. The alloy was pulverized and classified by sifting it through a sieve with a mesh of 45 μm to obtain primary particles of a negative-electrode active material in Comparable example 1.

(Microstructure Observation)

Figure 2:
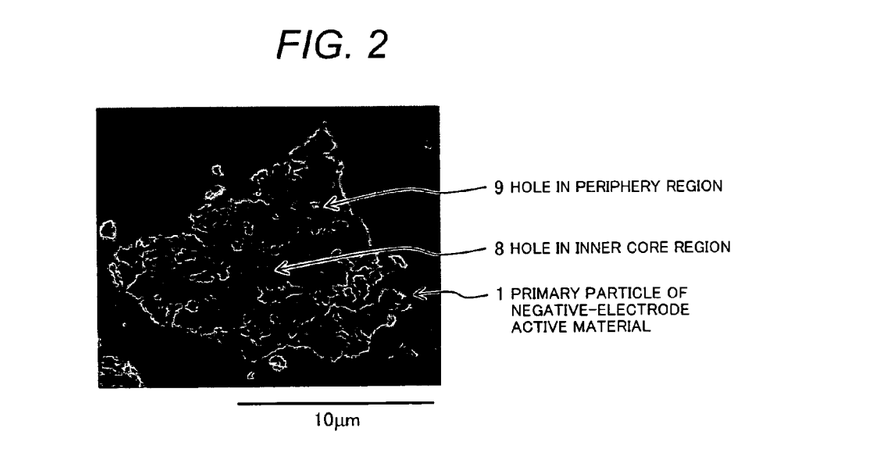
FIG. 2 is a scanning electron micrograph showing a cross section of a primary particle of a negative-electrode active material in Example 1.
Figure 3:
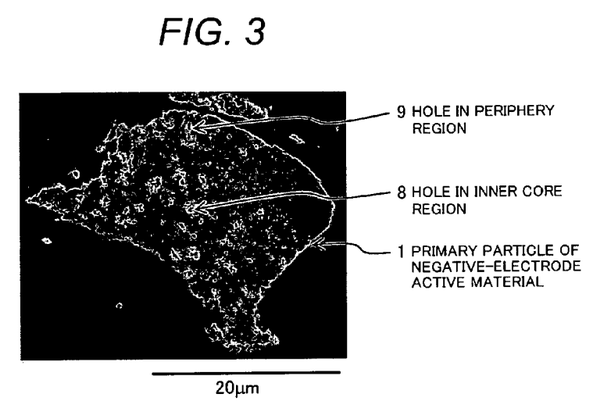
FIG. 3 is a scanning electron micrograph showing a cross section of a primary particle of a negative-electrode active material in Example 2.
Figure 4:
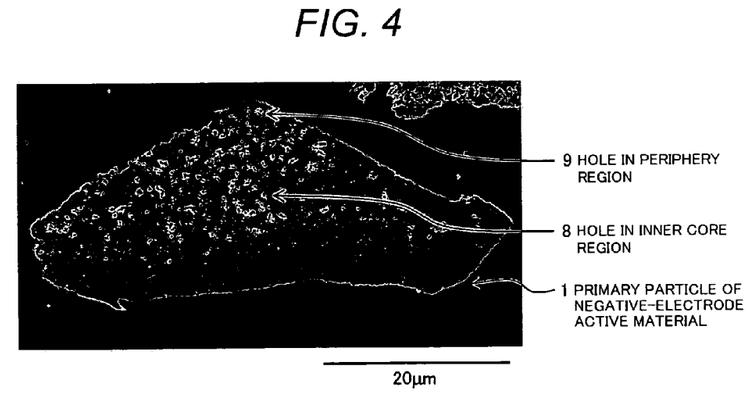
FIG. 4 is a scanning electron micrograph showing a cross section of a primary particle of a negative-electrode active material in Example 4.
Figure 5:
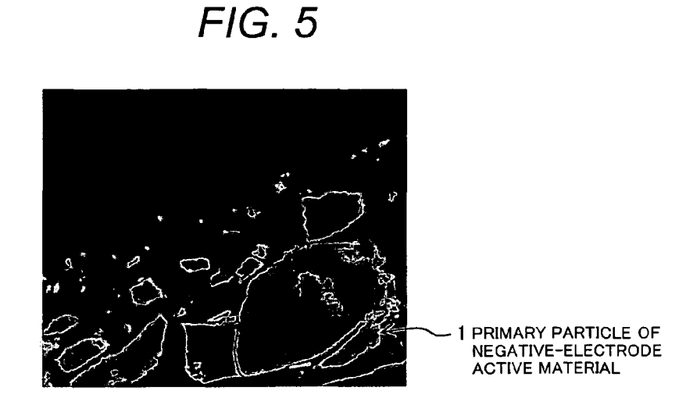
FIG. 5 is a scanning electron micrograph showing a cross section of a primary particle of a negative-electrode active material in Comparative Example 1.

A cross section of a primary particle of the negative-electrode active material in each of Examples 1, 2, and 4 and Comparative example 1 was observed with a scanning electron microscope. The results are shown in FIGS. 2 to 5. FIG. 2 is a scanning electron micrograph showing a cross section of a primary particle of a negative-electrode active material in Example 1. FIG. 3 is a scanning electron micrograph showing a cross section of a primary particle of a negative-electrode active material in Example 2. FIG. 4 is a scanning electron micrograph showing a cross section of a primary particle of a negative-electrode active material in Example 4. FIG. 5 is a scanning electron micrograph showing a cross section of a primary particle of a negative-electrode active material in Comparative example 1.

As shown in FIGS. 2 to 4, the negative-electrode active materials of Examples 1, 2, and 4 were confirmed to have holes both in the inner core region and the periphery region of a primary particle. On the other hand, as shown in FIG. 5, the negative-electrode active material of Comparative example 1 was confirmed to have no holes.

(Crystallite Diameter)

Each of the average crystallite diameters of the negative-electrode active materials in Example 1 and Comparative example 1 was determined based on a scanning electron micrograph of a cross section of a primary particle thereof. Also, each of the average crystallite diameters of the negative-electrode active materials in Examples 2 and 3 was determined based on a scanning electron micrograph of a surface of a primary particle thereof. The results are shown in Table 2.

TABLE 2

| | Average crystallite diameter |
|---|---|
| Example 1 | 0.50 μm |
| Example 2 | 0.12 μm |
| Example 3 | 0.08 μm |
| Comparative example 1 | 4.85 μm |

As shown in FIG. 2, each of the negative-electrode active materials in Examples 1 to 3 had an average crystallite diameter of 1 μm or less. Also, the average crystallite diameters of the negative-electrode active materials of Examples 2 and 3, which contained boron, were smaller than that of the negative-electrode active material of Example 1 that did not contain boron. The more the boron content was, the smaller the average crystallite diameter was. In other words, it was confirmed that if a negative-electrode active material contains boron, the average crystallite diameter becomes smaller.

(Measurement of Hole Diameter and Porosity)

The average hole diameters of the negative-electrode active materials in Examples 1 and 2 were measured by a mercury porosimeter. Also, the bulk densities of the negative-electrode active materials in Examples 1, 2 and 4, and Comparative example 1 were measured by the mercury porosimeter. As has been described above, holes were not recognized in the negative-electrode active material of Comparative Example 1, the bulk density of the negative-electrode active material of Comparative example 1 was deemed as the true density thereof. The average porosities of the negative-electrode active materials in Examples 1, 2, and 4 were calculated by dividing the bulk densities of the negative-electrode active materials in Examples 1, 2, and 4 by that of the negative-electrode active material in Comparative example 1, subtracting the quotients from 1, and multiplying the obtained values by 100.

In addition, scanning electron micrographs of primary particle cross sections of the negative-electrode active materials were analyzed using an image analysis software (A-zou Kun, a product of Asahi Kasei Engineering Co., Ltd.) to determine the average hole diameters and the average distances between adjacent centroids, which was used to determine the dispersivities. The average hole diameters measured by a mercury porosimeter (average diameters MP), the average hole diameters determined by image analysis (average diameters IA), the porosities, the dispersivities, and the average distances between adjacent centroids are shown in Table 3. Besides, it was impossible to measure the average hole diameter MP of the negative-electrode active material in Example 4 because the holes were too small for mercury to intrude.

TABLE 3

| | Average hole diameter PM | Average hole diameter IA | Average porosity | Dispersivity | Average distance between adjacent holes |
|---|---|---|---|---|---|
| Example 1 | 0.38 μm | 0.29 μm | 17% | 0.62 | 1.87 μm |
| Example 2 | 0.22 μm | 0.20 μm | 6% | 0.68 | 1.51 μm |
| Example 4 | — | 0.17 μm | 13% | 0.54 | 0.49 μm |

As shown in Table 3, each of the negative-electrode active materials in Examples 1, 2, and 4 included holes having an average diameter of 0.4 μm or less. For each of the negative-electrode active materials, the average porosity was 5% or more; the dispersivity was 1 or less; and the average distance between adjacent holes was 2 μm or less. Also, the average distance between adjacent holes in the negative-electrode active material of Example 1 was 3.7 times the average crystallite diameter thereof, and that of the negative-electrode active material of Example 2 was 12.6 times the average crystallite diameter thereof. Both were smaller than 15 times. Moreover, the average hole diameters of the negative-electrode active materials in Examples 2 and 4, which contained boron, were smaller than that of the negative-electrode active material in Example 1 that did not contain boron.

(Evaluation of Cycle Characteristics)

Each of the negative-electrode active materials in Examples 1 to 4 and Comparative example 1 was kneaded with acetylene black as a conductive material and a solution of polyvinylidene fluoride in N-methylpyrrolidone as a binder to prepare a slurry. Each of the slurries thus obtained was applied evenly on a copper foil using a coater, dried in the air, pressed, and then dried in a vacuum to fabricate an anode. The solution used as an electrolyte was obtained by adding vinylene carbonate to a mixed solvent of ethylene carbonate, dimethyl carbonate, and ethyl methyl carbonate, and further adding 1 M (1 mol/L) of $LiPF_6$ to the obtained solvent. A lithium metal was used as the counter electrode (cathode). Test cells were fabricated from the anodes, electrolyte, and cathodes thus obtained.

The test cells were subjected to 10 charge-discharge cycles. In each cycle, the cells were charged at a constant current and a constant voltage until the voltage reached 0.01 V vs. $Li/Li^+$, and were discharged at a constant current until the voltage reached 2 V vs. $Li/Li^+$. The discharge capacities after 10 cycles are shown in Table 4.

TABLE 4

| | Discharge capacity after 10 cycles |
|---|---|
| Example 1 | 473 Ah/kg |
| Example 2 | 548 Ah/kg |
| Example 3 | 571 Ah/kg |
| Example 4 | 612 Ah/kg |
| Comparative example 1 | 427 Ah/kg |

As shown in Table 4, it was confirmed that each of the negative-electrode active materials in Examples 1 to 4 had a higher discharge capacity after 10 cycles than that of the negative-electrode active material in Comparative example 1. In other words, it was demonstrated that a lithium-ion rechargeable battery anode containing a negative-electrode active material having holes both in the inner core region and the periphery region of a primary particle thereof has improved cycle characteristics, and that the lithium-ion rechargeable battery including the lithium-ion rechargeable battery anode in accordance with the present invention has a higher capacity and improved cycle life. More specifically, since the negative-electrode active materials in Examples 2 to 4, which contained boron, had higher discharge capacities after 10 cycles than that of the negative-electrode active material in Example 1, which did not contain boron, it was demonstrated that a negative-electrode active material containing boron has improved cycle characteristics.

As has been described above, since it has a high capacity and improved cycle life compared with conventional anodes composed of graphite materials or the like, the lithium-ion rechargeable battery anode according to the present invention can be preferably applied to power supplies for mobile devices and stationary electric energy storages.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An anode for a lithium-ion rechargeable battery, comprising:
 a primary particle of a negative-electrode active material made of an alloy including at least one of silicon and tin, and at least one element selected from elements that do not chemically react with lithium;
 a conductive material; and
 a binder,
 wherein: the primary particle is a continuous solid substance including a plurality of crystallites, the plurality of crystallites are bound to one another by metallic bonding; and holes formed among the plurality of crystallites are present both in a core region in a central region of the primary particle and in a periphery region that covers the core region, and
 wherein dispersivity, which is a value obtained by dividing the standard deviation of a distance between adjacent centroids of the holes by an average distance between adjacent centroids of the holes, is 1 or less.

2. The anode for a lithium-ion rechargeable battery according to claim 1, wherein primary particles of the negative-electrode active material, including the primary particle of the negative-electrode active material, have an average particle diameter of 50 μm or less.

3. The anode for a lithium-ion rechargeable battery according to claim 1, wherein the holes have an average hole diameter of 1 μm or less.

4. The anode for a lithium-ion rechargeable battery according to claim 1, wherein primary particles of the negative-electrode active material, including the primary particle of the negative-electrode active material, have an average porosity of not less than 5 vol % but not more than 80 vol %.

5. The anode for a lithium-ion rechargeable battery according to claim 1, wherein silicon and/or tin contained in the primary particle of the negative-electrode active material has an average crystallite diameter of 1 μm or less.

6. The anode for a lithium-ion rechargeable battery according to claim 1, wherein an average distance between adjacent holes in the primary particle of the negative-electrode active material is 2 μm or less.

7. The anode for a lithium-ion rechargeable battery according to claim 1, wherein an average distance between adjacent holes in the primary particle of the negative-electrode active material is not more than 15 times an average crystallite diameter of silicon and/or tin contained in the primary particle of the negative-electrode active material.

8. The anode for a lithium-ion rechargeable battery according to claim 1, wherein the negative-electrode active material contains a total of 50 mass % or more of silicon and tin.

9. The anode for a lithium-ion rechargeable battery according to claim 1, wherein the at least one element that does not chemically react with lithium is selected from iron, nickel, copper, cobalt, manganese, silver, and gold.

10. The anode for a lithium-ion rechargeable battery according to claim 8, wherein:
 in the case of the negative-electrode active material containing tin, the negative-electrode active material further contains 0.01 mass % or more of at least one element selected from boron, phosphorus, carbon, and silicon.

11. The anode for a lithium-ion rechargeable battery according to claim 1, wherein the negative-electrode active material is fabricated by a rapid quenching technique.

12. The anode for a lithium-ion rechargeable battery according to claim 1, wherein the negative-electrode active material is fabricated by a single roll method.

13. A lithium-ion rechargeable battery comprising:
 a cathode;
 an anode;
 a separator; and
 an electrolyte,
wherein the anode is the anode for a lithium-ion rechargeable battery according to claim 1.

14. An anode for a lithium-ion rechargeable battery, comprising:
 a primary particle of a negative-electrode active material other than a carbon-based material, the negative-electrode active material comprising a continuous alloy of at least one of silicon and tin, and at least one element selected from elements that do not chemically react with lithium, the alloy comprising a plurality of crystallites, wherein holes are present both in a core region of the alloy and a periphery region of the alloy that covers the core region;
 a conductive material; and
 a binder,
 wherein dispersivity, which is a value obtained by dividing the standard deviation of a distance between adjacent centroids of the holes by an average distance between adjacent centroids of the holes, is 1 or less.

15. The anode for a lithium-ion rechargeable battery according to claim 14, wherein the negative-electrode active material contains a total of 50 mass % or more of silicon and tin.

16. The anode for a lithium-ion rechargeable battery according to claim 14, wherein the at least one element that does not chemically react with lithium is selected from iron, nickel, copper, cobalt, manganese, silver, and gold.

17. The anode for a lithium-ion rechargeable battery according to claim 15, wherein:
 in the case of the negative-electrode active material containing tin, the negative-electrode active material further contains 0.01 mass % more of at least one element selected from boron, phosphorus, carbon, and silicon.

18. A lithium-ion rechargeable battery comprising:
 a cathode;
 an anode;
 a separator; and
 an electrolyte,
wherein the anode is the anode for a lithium-ion rechargeable battery according to claim 14.

19. The anode for a lithium-ion rechargeable battery according to claim 14, wherein the plurality of crystallites are bound to one another by metallic bonding, and the holes are formed among the plurality of crystallites.

* * * * *